United States Patent
Maeda et al.

(10) Patent No.: US 6,922,737 B2
(45) Date of Patent: Jul. 26, 2005

(54) STORAGE CONTROL DEVICE AND METHOD FOR MANAGEMENT OF STORAGE CONTROL DEVICE

(75) Inventors: Masami Maeda, Tokyo (JP); Yoshihiro Asaka, Tokyo (JP); Hidetoshi Sakaki, Tokyo (JP); Masaru Tsukada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/241,206

(22) Filed: Sep. 10, 2002

(65) Prior Publication Data

US 2003/0051081 A1 Mar. 13, 2003

(30) Foreign Application Priority Data

Sep. 10, 2001 (JP) ........................................ 2001-273932

(51) Int. Cl.$^7$ .............................................. G06F 13/10
(52) U.S. Cl. .............................. 710/20; 710/29; 710/38; 709/239; 712/27; 712/210
(58) Field of Search .............................. 710/20, 29, 38, 710/36; 709/239; 712/27, 201, 25

(56) References Cited

U.S. PATENT DOCUMENTS

| | | | | |
|---|---|---|---|---|
| 4,313,162 A | * | 1/1982 | Baun et al. .................... | 710/38 |
| 5,390,215 A | * | 2/1995 | Antia et al. .................. | 375/341 |
| 5,414,851 A | * | 5/1995 | Brice, Jr. et al. ............ | 718/104 |
| 5,611,056 A | * | 3/1997 | Hotchkin ...................... | 710/306 |
| 5,754,484 A | * | 5/1998 | Perreault ..................... | 365/200 |
| 6,038,613 A | * | 3/2000 | Garcia et al. .................. | 710/1 |
| 6,112,248 A | * | 8/2000 | Maciel et al. ................ | 709/238 |
| 6,463,070 B1 | * | 10/2002 | Carneal et al. .............. | 370/428 |
| 6,523,138 B1 | * | 2/2003 | Natsume et al. .............. | 714/43 |
| 6,526,500 B1 | * | 2/2003 | Yumoto et al. ................ | 712/25 |

FOREIGN PATENT DOCUMENTS

| | | | | |
|---|---|---|---|---|
| JP | 09027794 A | * | 1/1997 | ............. H04J/3/04 |
| JP | 02000049754 A | * | 2/2000 | ............. H04J/13/04 |
| JP | 02000090237 A | * | 3/2000 | ............. G06T/1/00 |

* cited by examiner

*Primary Examiner*—Rehana Perveen
(74) *Attorney, Agent, or Firm*—Townsend and Townsend and Crew LLP

(57) ABSTRACT

A storage control device, connected to a host processing device through a full-duplex channel and for storing data received through the channel in a data storage means, comprises a plurality of channel processors for conducting a data-input-and-output process to the data storage means in correspondence with a command contained in data (a frame) sent from the host processing device through the channel, and a channel processor, among the plurality of channel processors, is assigned for executing the data-input-and-output process for the data (frame) according to a type of command contained in the data (frame). Thus, the storage control device of the present invention can use the full-duplex channel efficiently.

18 Claims, 9 Drawing Sheets

| | |
|---|---|
| CHP-assignment-process execution flag | — 301 |
| received WR-command data-amount counter | — 302 |
| received RD-command data-amount counter | — 303 |
| transmitted RD-command data-amount counter | — 304 |
| CHP-0-data-amount counter | — 305 |
| CHP-1-data-amount counter | — 306 |
| CHP-data ratio threshold | — 307 |
| RD/WR data ratio threshold | — 308 |
| CHP-queue-data-number ratio threshold | — 309 |
| CHP-queue-data-amount ratio threshold | — 310 |
| RD/WR-throughput rate threshold | — 311 |
| monitoring-execution-interval time | — 312 |
| monitoring-execution-interval I/O number | — 313 |
| monitoring-start time | — 314 |
| monitoring-end time | — 315 |
| I/O-number counter | — 316 |
| work area | — 317 |

FIG. 3

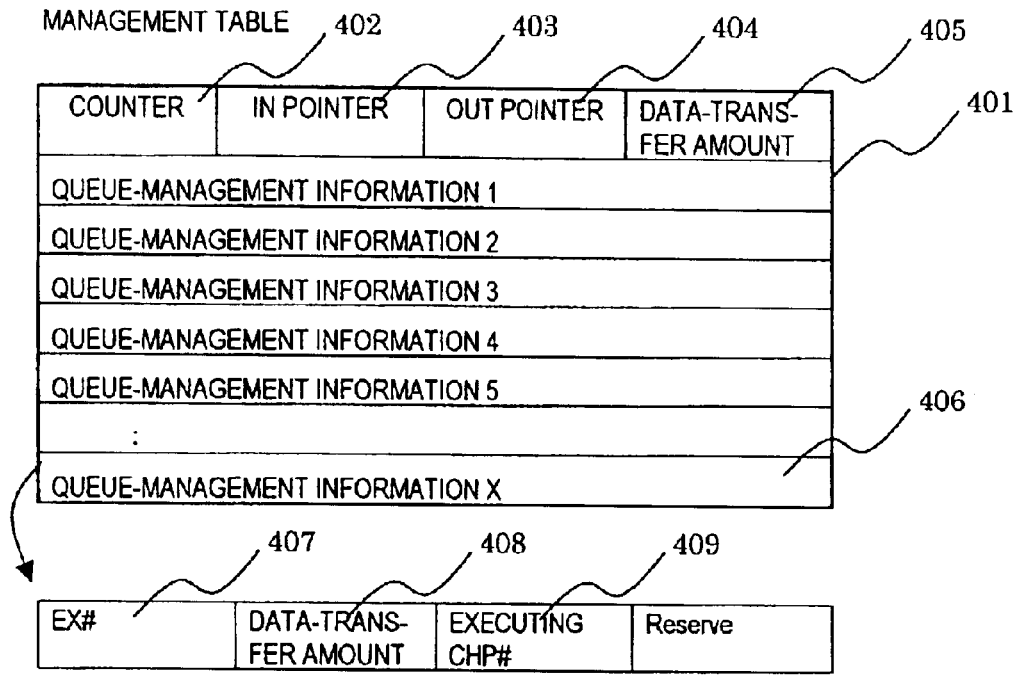
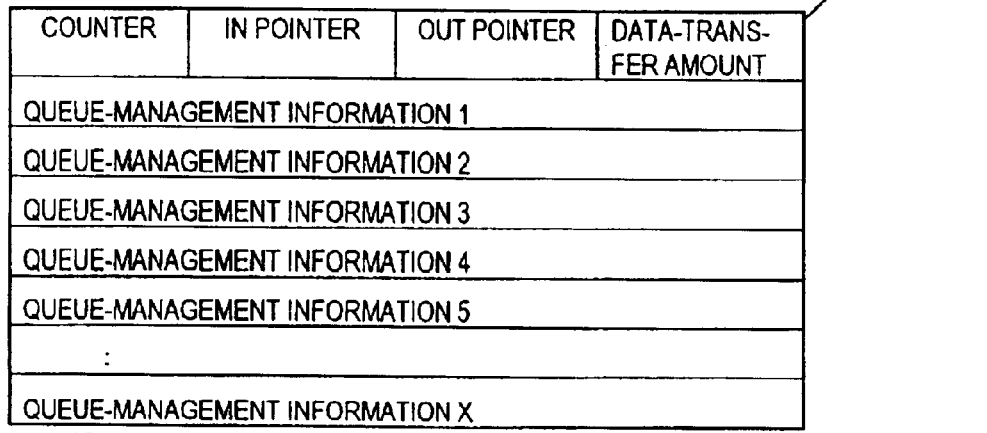
FIG. 4

STORAGE CONTROL DEVICE AND METHOD FOR MANAGEMENT OF STORAGE CONTROL DEVICE

BACKGROUND OF THE INVENTION

The present application claims priority upon Japanese Patent Application No. 2001-273932 filed on Sep. 10, 2001, which is herein incorporated by reference.

1. Field of the Invention

The present invention relates to a storage control device which connects to a host processing device through a full-duplex channel and which stores data received through the channel in a data-storage means, and more particularly, to a technique for efficiently utilizing the above-mentioned channel.

2. Description of the Related Art

Fibre Channel Protocol (referred to hereinafter as "Fibre Channel") is known as a communication protocol for connecting a host processing device, such as a mainframe, and a storage control device, such as a disk array device. Reference should be made to FC-PH (Fibre Channel Physical and Signaling Interface) of ANSI (American National Standard for Information Technology) for details.

Fibre Channel is basically configured to have a physical connection between two ports. A pair of Fibre Channel ports is mutually connected physically via two channels for transmit/receive (i.e., a full-duplex channel). The communication in Fibre Channel, conducted between the storage control device and the host processing device through this channel, is carried out based on a data unit called a "frame". A bundle of a plurality of frames is called a "sequence", and a bundle of a plurality of sequences is called an "exchange". For example, a series of processes, corresponding to a data-read-out instruction (Read instruction) conducted from a host processing device to a storage control device, is carried out on an exchange-by-exchange basis. Further, in communication between the host processing device and the storage control device in Fibre Channel, it is possible to transmit/receive commands and/or frames without interlocking.

FIG. 1 shows an example of a data-processing system structured to comprise a storage control device 10 connected to a channel of Fibre Channel, and a host processing device 20 using the above. The storage control device 10 is, for example, a disk array device comprised mainly of a cache memory 11, a data storage means 12 such as disk units, and CPUs, memories and so forth. The storage control device 10 also comprises a channel controlling section 14 which, for example, conducts data communication with the host processing device 20, assigns data to be the object of processing to channel processors 13, manages various data and tables, and/or manages queues for various instructions to the channel processors 13; and comprises the channel processors 13 which divide the frames received from the channel controlling section 14, and execute processes corresponding to each of the frames and data-transmission control to the data storage means 12 via the cache memory 11. Here, the host processing device 20 is, for example, a mainframe, an office computer or a personal computer.

In communication between the storage control device 10 and the host processing device 20, the storage control device 10 assigns a channel processor 13 for processing each of the frames in the order of receipt of the frames. Here, in case the channel processor 13 is in use, the channel processor 13 not in use will be assigned for processing of the frame.

The commands contained in a frame sent from the host processing device 20 to the storage control device 10 is broadly classified mainly into a WRITE command for instructing data write-in to the data storage means 12, and a READ command for instructing read-out. In conducting processes corresponding to these commands, there sometimes occurs a period in which both of the plurality of channel processors 13 are only processing either one of the WRITE command or the READ command at the same time, in a case where frames, containing only either one of the WRITE command or the READ command, are successively sent from the host processing device 20, or, for reasons such as that data amount to be the object of write-in or read-out is large. During such a period, the full-duplex communication will not effectively function.

That is, for example, in case there are only two channel processors 13 in the structure, although the communication load is heavy only in channel 51 in the direction from the host processing device 20 to the storage control device 10 among the above-mentioned full-duplex channel (hereinafter referred to as "receiving channel"), the channel 52, in the direction from the storage control device 10 to the host processing device 20, (hereinafter referred to as "transmitting channel") is nearly unused. Thus, during such a period, the full-duplex channel 50 will not function effectively.

SUMMARY OF THE INVENTION

The present invention has been contrived in view of such circumstances, and an objective of the present invention is to provide a storage control device which can efficiently utilize a full-duplex channel.

In order to achieve the above and other objectives, one main aspect of the present invention is a storage control device, connected to a host processing device through a full-duplex channel and for storing data received through the channel in a data storage means, comprising a plurality of channel processors for conducting a data-input-and-output process to the data storage means in correspondence with a command contained in data (a frame) sent from the host processing device through the channel, and also comprising means for assigning a channel processor, among the plurality of channel processors, for executing the data-input-and-output process for the data (frame) according to a type of command contained in the data (frame).

Specifically, for example, in a case of a communication where a host processing device and a storage control device are connected via Fibre Channel, a channel processor is assigned per each exchange for processing an exchange to which a frame belongs, according to whether the command contained in the frame is a write-in command or a read-out command to the data storage means, using the above-mentioned feature of Fibre Channel in that interlocking is unnecessary. Therefore, the period, in which all channel processors simultaneously execute either the write-in process or the read-out process only, will decrease; and thus, a balance is met in the load between the receiving channel and the transmitting channel of the full-duplex channel, and it becomes possible to efficiently use the channels.

BRIEF DESCRIPTION OF THE DRAWINGS

For a more complete understanding of the present invention and the advantages thereof, reference is now made to the following description taken in conjunction with the accompanying drawings wherein:

FIG. 3 is a diagram showing a CHP-assignment-process management table according to one embodiment of the present invention;

FIG. 4 is a diagram showing a RD/WR-data-queue management table according to one embodiment of the present invention;

DESCRIPTION OF THE PREFERRED EMBODIMENTS

Figure 1:
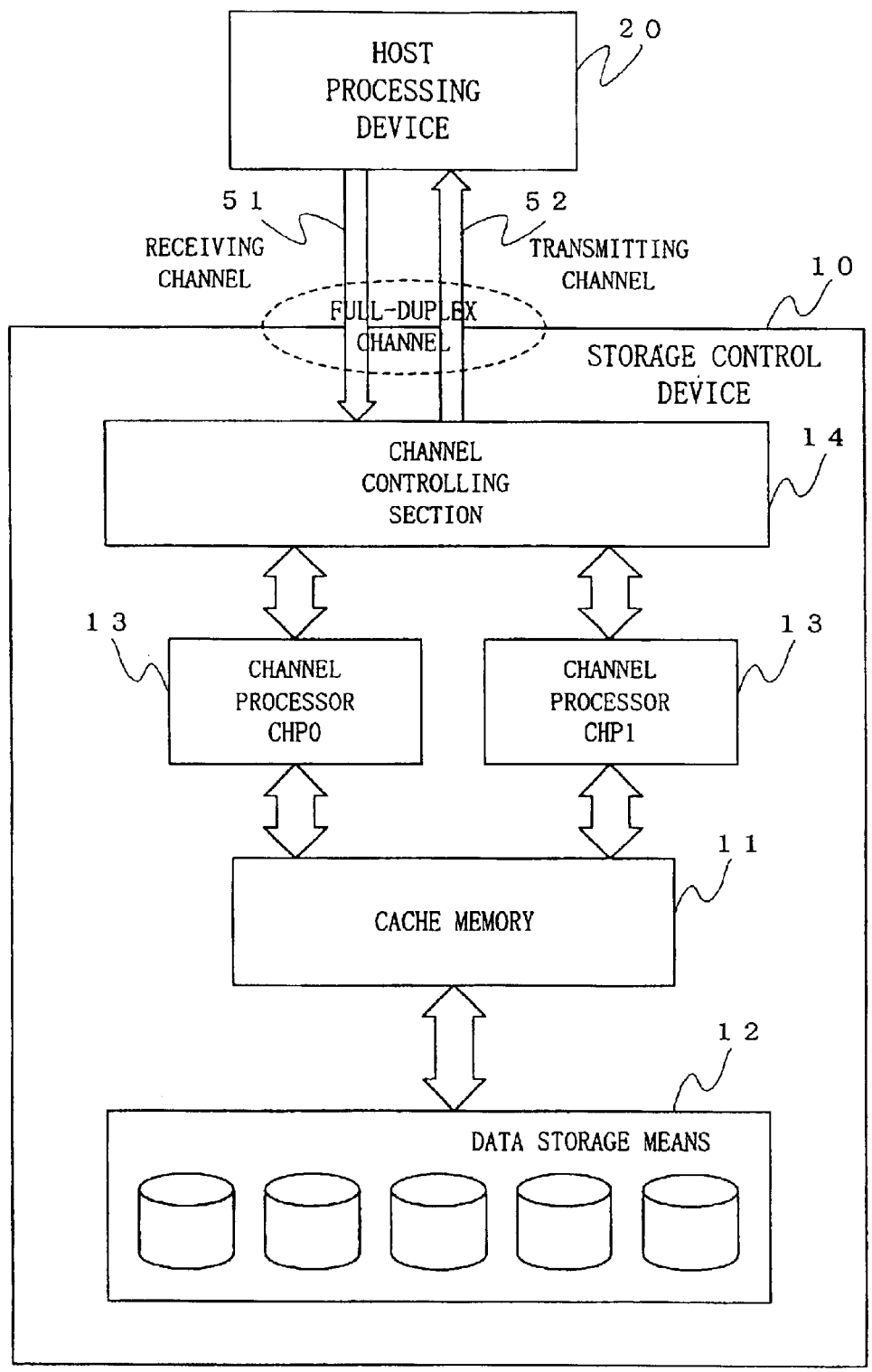
FIG. 1 is a schematic structural diagram of a data processing system according to one embodiment of the present invention.

Hereinafter, a data processing system according to one embodiment of the present invention will be explained. The structure of the data processing system is similar to that shown in FIG. 1, and thus, detailed explanation will be omitted and characteristic portions of the present invention will mainly be explained below. Further, for reasons of convenience, a storage control device 10 explained in this embodiment will only comprise two channel processors 13 (each of which is hereinafter referred to as "CHP"). These channel processors are referred to as CHP0 and CHP1. Furthermore, the term "WRITE" is abbreviated as "WR", and the term "READ" is abbreviated as "RD".

Figure 2:
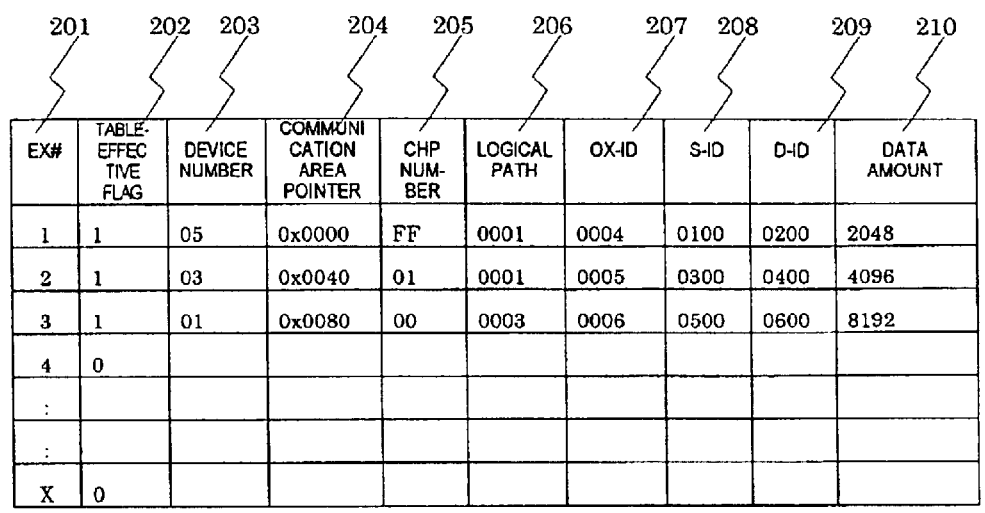
FIG. 2 is a diagram showing an exchange management table according to one embodiment of the present invention.

In a memory of a channel controlling section 14 of the storage control device 10, there are stored various tables used such as for data communication with the host processing device 20, and for processes carried out according to commands sent from the host processing device 20, such as read/write process of data to a data storage means 12. FIG. 2 shows an exchange-management table 200 among the various tables. This table 200 manages the exchanges produced during communication with the host processing device 20.

To the table-effective flag 202 of the table shown in FIG. 2, a bit is set to indicate whether the corresponding exchange is currently under process, and "1" is set to an exchange under process, whereas "0" is set to an exchange not in process. To the device number 203, there is set an indication number of a storage medium (such as a disk unit) of the data storage means to be the object of process of the exchange.

To the CHP number 205 of the table shown in FIG. 2, there is set a number of the CHP which carries out the process of the corresponding exchange. To the communication area pointer 204, there is set a physical address in the memory to where a frame, received through a receiving channel 51, is stored. To the OX-ID (Originator Exchange_ID) 207, there is set an exchange number assigned at the host processing device 20. To the S-ID (Source_ID) 208, there is set a port address of a Fibre Channel from where transmission was made. To the D-ID (Destination_ID) 209, there is set a port address of a Fibre Channel to where the corresponding exchange is to be transmitted.

Note that, the above-mentioned items except for the table-effective flag are set when the exchange is under process, i.e., when the table-effective flag is "1". Further, the values of OX-ID 207, S-ID 208 and D-ID 209 uniquely correspond to each of the exchanges. For example, when a series of frames is successively sent from the host processing device 20, by searching for the exchange having the same OX-ID 207, S-ID 208, and D-ID 209 set to each of the frames from the exchange-management table 200, it is possible to know, for example, whether a frame is a head frame (if the frame is not registered to the exchange-management table), or to which exchange each of the frames belongs.

On the other hand, FIG. 3 shows a CHP-assignment-process management table 300 stored in a memory of the storage control device 10. The CHP-assignment-process execution flag 301 in this table is used for controlling execution of a CHP-assignment process. The use of this flag will be explained later on.

In the received WR-command data-amount counter 302 and the received RD-command data-amount counter 303, when the channel controlling section 14 receives a command from the host processing device 20, a data amount processed by a WR command or RD command is added. Further, in the transmitted RD-command data-amount counter 304, there is set a data amount transmitted from the storage control device 10 to the host processing device 20 in response to a RD command transmitted from the host processing device 20 to the storage control device 10, and when there is a process-complete notification from the CHP 13 and an exchange is nullified (or made ineffective) in the exchange-management table 200, a value is added thereto.

In the CHP-0-data-amount counter 305 and the CHP-1-data-amount counter 306, an amount of data processed by each of the CHPs 0, 1 is added. The thresholds 307 to 311, such as the RD/WR-data-ratio threshold, are used for controlling execution of the CHP-assignment process explained later on.

The monitoring-execution-interval timer 312 and the monitoring-execution-interval I/O number 313 are parameters referred to upon various polling processes executed by the storage control device 10. Further, the monitoring-start time 314 and the monitoring-end time 315 are used when calculating the throughput of data processed by the storage control device 10. I/O-number counter 315 is information necessary for monitoring with I/O number, and to the counter 315, there is added an I/O-request number sent from the host processing device 20. The work area 316 is used such as for temporary saving of various calculations and/or data.

FIG. 4 shows RD/WR-data-queue management tables 401, 410 stored in a memory of the channel controlling section 14. The tables 401, 410 manage queuing states of RD commands and/or WR commands, which are the objects of process of the storage control device 10, in a FIFO (First In First Out) manner. The tables 401, 410 respectively manage, for example, a counter 402 indicating queued numbers, an IN pointer 403 indicating a storage address of a head queue, an OUT pointer 404 indicating a storage address of an end queue, a data-transfer amount 405 managing the data size of the whole queue, and queue-management information 406 corresponding to each of the commands. To the queue-management information 406, there are written, for example, an exchange number 407 assigned by the storage control device 20, data-transfer amount 408, and a CHP-number 409 indicating the CHP for executing the exchange.

Figure 5:
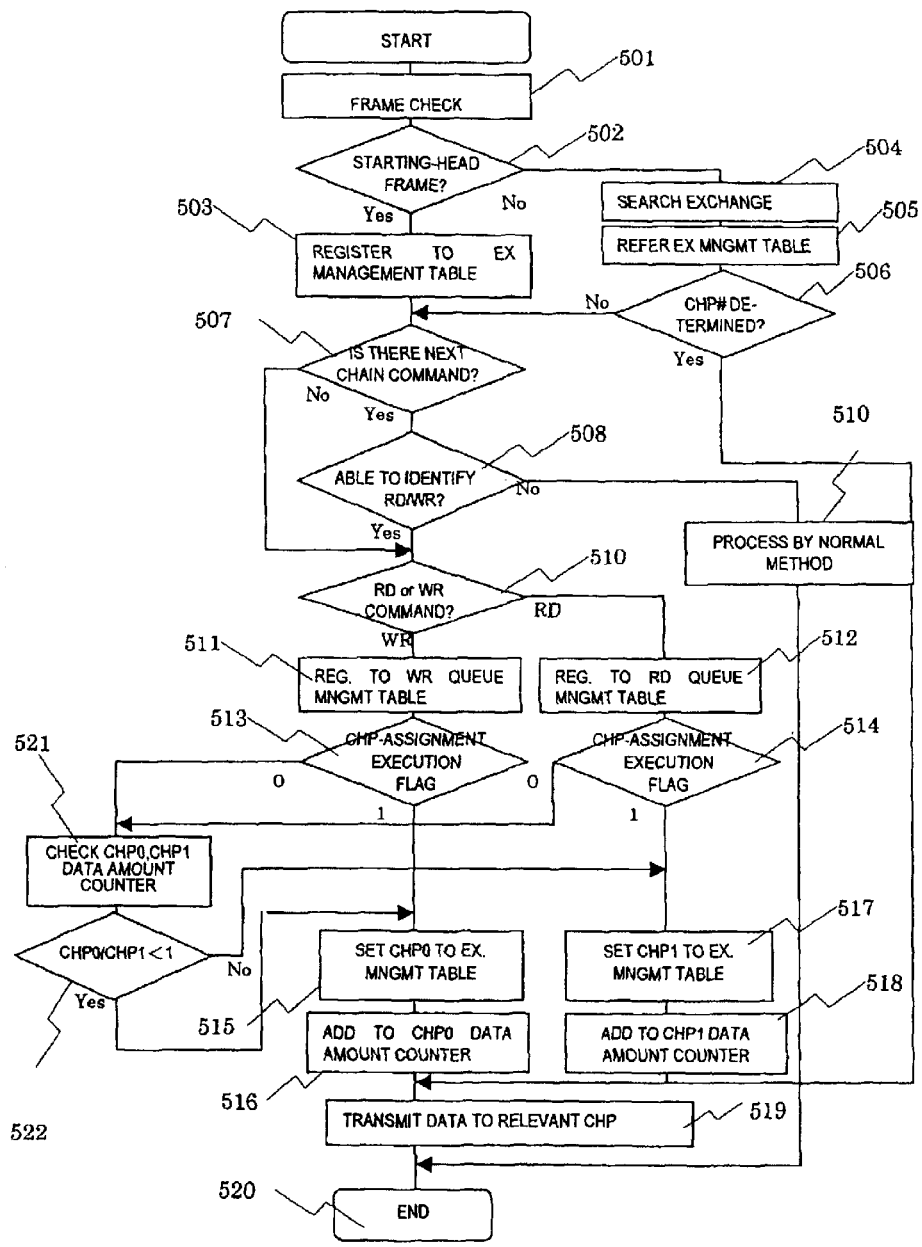
FIG. 5 is a flowchart explaining a CHP-assignment process according to one embodiment of the present invention.

Next, the CHP-assignment process, conducted by the storage control device 10 in the full-duplex communication with the storage control device 10 and the host processing device 20, will be explained in detail with reference to the flowchart shown in FIG. 5.

When a frame is received from the host processing device 20 through the receiving channel 51 among the full-duplex channel, the storage control device 10 firstly checks whether the received frame is a starting-head frame for a new exchange (steps 501, 502). If the frame is a starting-head frame, a field for the frame is newly registered to the exchange-management table (referred to as EX MANAGEMENT TABLE or EX MNGMT TABLE in the figure) using an unused exchange number (step 503). The process for the case where the frame is not a starting-head frame will be explained later on.

Then, the storage control device 10 refers to a frame-control field (F_ControlField) of the above-mentioned frame to check whether there is a following frame (step 507). If there is a following frame of the present frame, the storage control device 10 further checks to see whether the present frame contains either the RD command or the WR command (step 508). This check is conducted, for example, by comparing the contents of a command-description column of the frame with a command list previously registered in the storage control device 10.

As a result of this checking, in case the frame does not contain a command (or, if it is indefinite whether the frame contains a command), the storage control device 10 processes the present frame with a normal CHP-assignment mode, that is, a mode in which a channel processor 13 is assigned for processing each of the frames in the order of receipt of the frames, and in case the channel processor 13 is in use upon assignment of a channel processor 13 for a certain frame, the channel processor 13 not in use is assigned for processing the frame (step 510).

On the other hand, in case the frame contains either a RD command or a WR command, the following process is conducted. Firstly, if the frame contains a WR command, the storage control device 10 registers, to the WR-data-queue management table 410 (or referred to as WR QUEUE MNGMT TABLE in the figure), the exchange number of the present frame and the data amount to be processed according to the WR command (step 511). If the frame contains a RD command, the storage control device 10 registers, to the RD-data-queue management table 401 (or referred to as RD QUEUE MNGMT TABLE in the figure), the exchange number of the present frame and the data amount to be processed according to the RD command (step 512). If registration is made to the respective queue-management tables, the counter 402 and the OUT pointer 404 of each of the tables are incremented by 1.

Next, the storage control device 10 checks the state of the CHP-assignment-process execution flag 301 of the condition-management table. If "1" is set to the CHP-assignment-process execution flag 301, the process proceeds to decide whether a CHP-assignment process is to be conducted (step 513, 514). If the present frame contains a WR command, a "0", indicating that CHP0 has been assigned to the exchange to which the present frame belongs, is set to the CHP number column 205 of the exchange in the exchange-management table 200 (step 515). Also, the data amount of the present frame is added to the CHP0-data-amount counter 305 in the CHP-assignment-process management table 300 (step 516), and data necessary for processing the present frame is transferred to CHP0 in order to process the frame (step 519). Note that, in case the frame contains a RD command, process is conducted in a similar manner as that explained above for the WR command (steps 512, 514, 517, 518).

On the other hand, if "0" is set to the CHP-assignment-process execution flag 301 in the processes of steps 513 and 514, the storage control device 10 does not carry out the CHP-assignment process according to the type of command (i.e., whether the command is a WR command or a RD command). Instead, the storage control device 10 carries out CHP assignment based on the ratio between the CHP0-data-amount counter 305 or the CHP1-data-amount counter 306 of the CHP-assignment-process management table 300 (step 521). That is, in this case, the storage control device 10 compares the values of the CHP0-data-amount counter 305 and the CHP1-data-amount counter 306, assigns the CHP, a smaller process load at that time (i.e., having a smaller value), for processing the frame, and transfers the necessary data for processing the frame to the assigned CHP.

Next, in a case where the frame is a not a starting-head frame in process 502, firstly, an exchange is searched from the exchange-management table 200 when taking the frame information (OX-ID, S-ID, LPN number, device number) as the key. Then, if a value has already been set to the CHP number 205 of the searched exchange, the necessary data for processing the frame is transmitted to the CHP corresponding to this value (step 516).

On the other hand, in a case where a value is not set to the CHP number 205, that is, if a CHP has still not been assigned for the exchange to which the frame belongs, the process proceeds to step 507. As elucidated above, the storage control device 10 successively processes the received frames.

Next, in order to more specifically explain the above-mentioned process, a process in which a frame of 1 CCW (Channel Command Word) chain consisting of DX/LOC/WRCKD (refer, for example, to "IBM 3990/9390 Storage Control Reference) from the host processing device 20 to the storage control device 10 will be explained according again to FIG. 5.

Upon receiving a frame containing a DX command, the storage control device 10 firstly decides whether the frame is a starting-head command frame (step 508). Here, the DX command is a starting-head command of the CCW chain, and is a starting-head frame of a new exchange. Thus, the storage control device 10 newly registers the exchange corresponding to this frame to the exchange-management table 200.

Next, the storage control device 10 refers to the frame-control field (F_ControlField) of the above-mentioned frame, and checks whether there exists a following frame (step 507). If there is a following frame, the storage control device 10 checks whether the frame is a frame containing either a RD command or a WR command (step 508). Here, since the DX command is not either a READ or WRITE command, the storage control device 10 will process the frame with the CHP assigned by the normal CHP-assignment mode (step 510).

Next, upon receiving a frame containing an LOC command constituting the CCW chain succeeding the DX command, the storage control device 10 checks whether the frame is a starting-head command (step 502). Here, since the frame described with the LOC command is not a starting-head frame, the storage control device 10 searches for the exchange corresponding to this frame from the exchange-management table 200 using the frame information (OX-ID, S-ID, LPN number, device number). Then, in this case, since the exchange corresponding to the above-mentioned frame information is already registered to the exchange-management table 200 by the frame described with the aforementioned DX command, that exchange will be retrieved as a result of the search.

Next, the storage control device 10 checks, by referring to the CHP number 205 of the exchange, whether a CHP for processing the exchange is already assigned to the searched exchange (step 506). Here, since a CHP is still not assigned to this exchange, the storage control device 10 checks, in the process of step 507, whether there exists a following chain for the frame. Here, since there exists a following chain for this frame (i.e., the WRCKD-command frame), the process of step 508 is executed.

Then, since the LOC command is a command that can be determined that it is a WRITE command from its operation code, the process leads to step 510, and the LOC command is registered to the WR-data-queue management table 410, and further, a "0" is set to the CHP number 205 in the exchange-management table 200 for the exchange corresponding to the frame (steps 511, 513). Further, the storage control device 10 adds the data amount processed with the LOC command, for example, the data amount to be written into a disk unit according to the command, to the CHP0-data-amount counter 305.

Next, when a frame described with a WRCKD command is sent from the host processing device 20, the storage control device 10 searches for the exchange number to which the frame belongs in the same manner as that for the LOC command described above (step 505), since the frame is not a starting-head frame (step 502). Then, in this case, since there already is a value set to the CHP number 205 and a CHP is assigned to the exchange to which the frame belongs (step 506), the storage control device 10 sends necessary data for processing the command to the CHP corresponding to the CHP number.

As explained above, the storage control device 10 assigns a CHP for processing the exchange to which the frame belongs, according to whether the command contained in the frame is a RD command or a WR command. Therefore, the period in which both of the CHPs 0, 1 are processing either WR or RD at the same time is decreased, and it is possible to decrease the period in which the balance of the load between the receiving channel 51 and the transmitting channel 52 of the full-duplex channel is uneven.

By the way, even in the case where the above-mentioned CHP-assignment mode is applied, there are possibilities that only the load for one of the channels become conversely biased, and the load among the channels go out of balance. This may occur in cases where, for example, the host processing device 20 continuously sends frames containing only either the WR command or the RD command, and one of the CHPs is occupied for that process for a long period of time, or, where the above-mentioned assignment process is executed when the data amount of the data to be the object of process with one command is large. Thus, in order to conduct load distribution more thoroughly, the storage control device 10 of the present invention further comprises various functions as described below.

Figure 6:
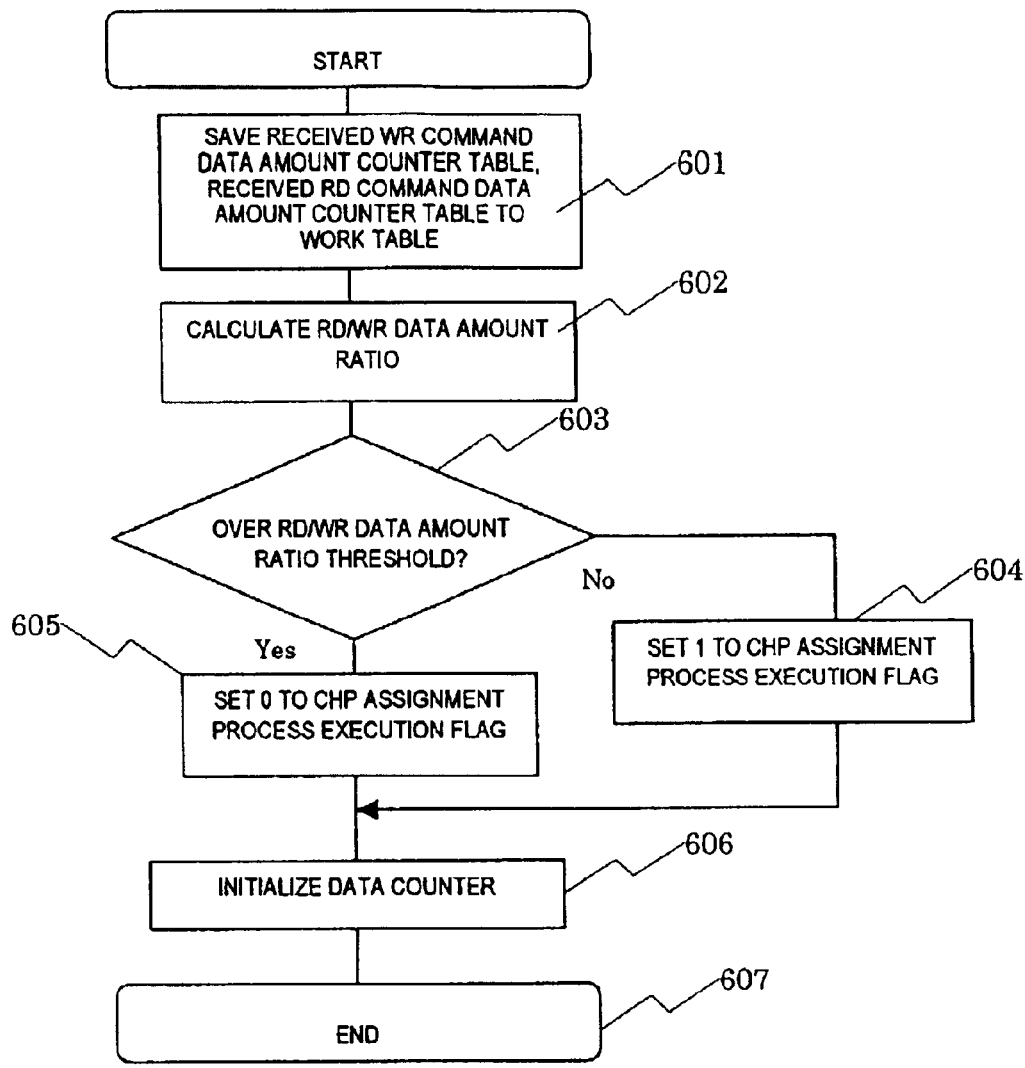
FIG. 6 is a flowchart explaining a process for controlling whether a CHP-assignment process is to be conducted, according to a data-amount ratio processed respectively with a RD command and a WR command according to one embodiment of the present invention.

The first function of the storage control device 10 is to control whether or not to conduct the CHP-assignment process, according to the data-amount ratio to be processed respectively by the RD command and the WR command sent from the host processing device 20. Specifically, as shown in FIG. 6, the storage control device 10 calculates, at an appropriate timing such as by a polling process, the data-amount ratio processed respectively by the RD command and the WR command from the increment in the received WR-command data-amount counter 302 and the received RD-command data-amount counter 303 for a certain period of time of the CHP-assignment-process management table 300 (step 602). If this ratio exceeds an RD/WR-data-amount ratio threshold of the CHP-assignment-process management table 300, a "0" is set to the CHP-assignment-process execution flag 301 therein (step 605), whereas if the ratio is equal to or below the RD/WR-data-amount ratio threshold, a "1" is set to the CHP-assignment-process execution flag 301 therein (step 604). Note that, in the example of FIG. 6, the contents of the received WR-data counter and the received RD-data counter are initialized each time the above-mentioned process is executed such as by a polling function (step 607).

The second function of the storage control device 10 is to control the CHP-assignment-process execution flag according to the queue state of each of the CHPs. Specifically, the storage control device 10 calculates from the RD/WR-data-queue management table 401, 410, at an appropriate timing such as in a certain period of time such as by a polling process or each time when processed data reaches a certain number, the number of commands being queued to the respective CHPs 0, 1 and the whole data amount to be the object of process with these commands.

Figure 7:
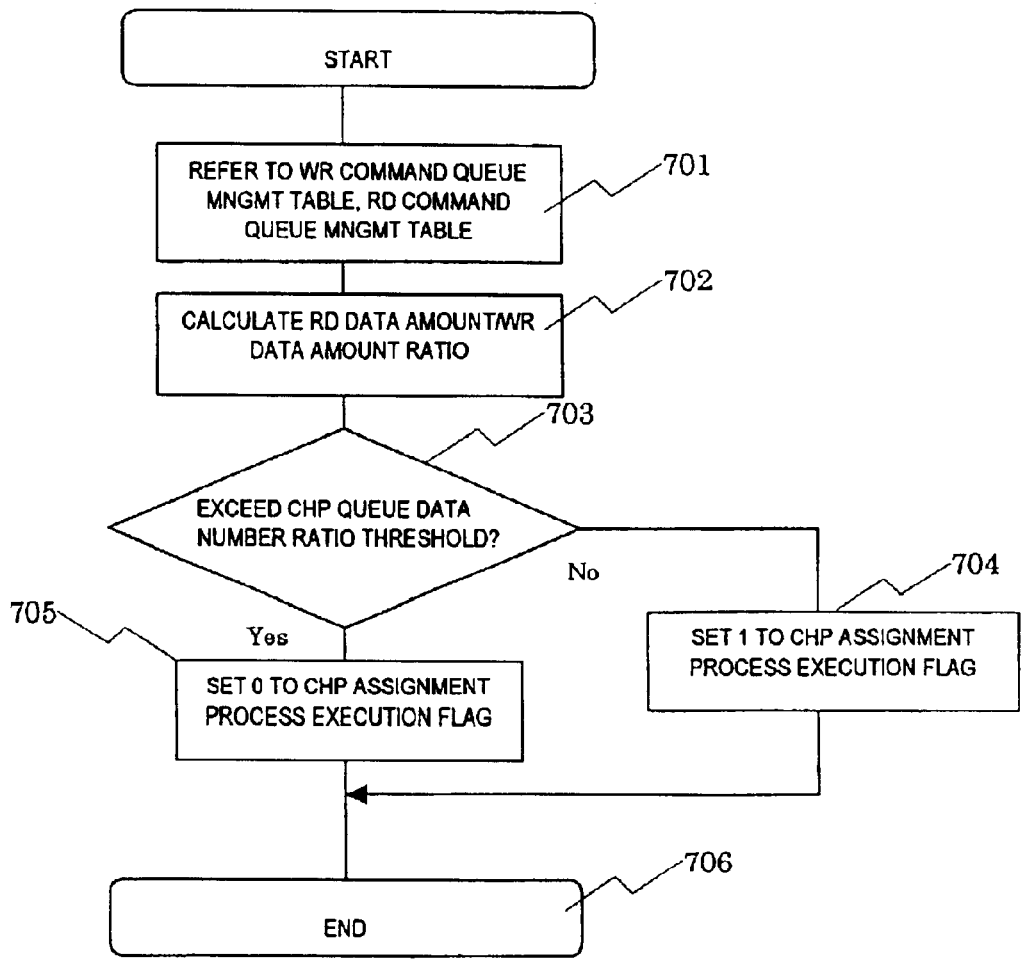
FIG. 7 is a flowchart explaining a process for controlling a CHP-assignment-process execution flag for determining whether a CHP-assignment process is to be conducted, according to a queue state of each of the CHPs according to one embodiment of the present invention.

The number of commands being queued is kept track of by the counter value in the RD/WR-data-queue management table 401, 410. Further, the whole data amount is kept track of by the data-transfer amount. By comparing the queued-number ratio of the respective RD commands and the WR commands, and the data-transfer-amount ratio of the respective RD commands and the WR commands with the CHP-queue-data-number ratio threshold 309 and the CHP-queue-data-amount ratio threshold 310 in the CHP-assignment-process management table 300, respectively, the CHP-assignment-process execution flag 301 is controlled according to whether the thresholds are exceeded. FIG. 7 is a flowchart showing an example of the above-mentioned process.

Figure 8:
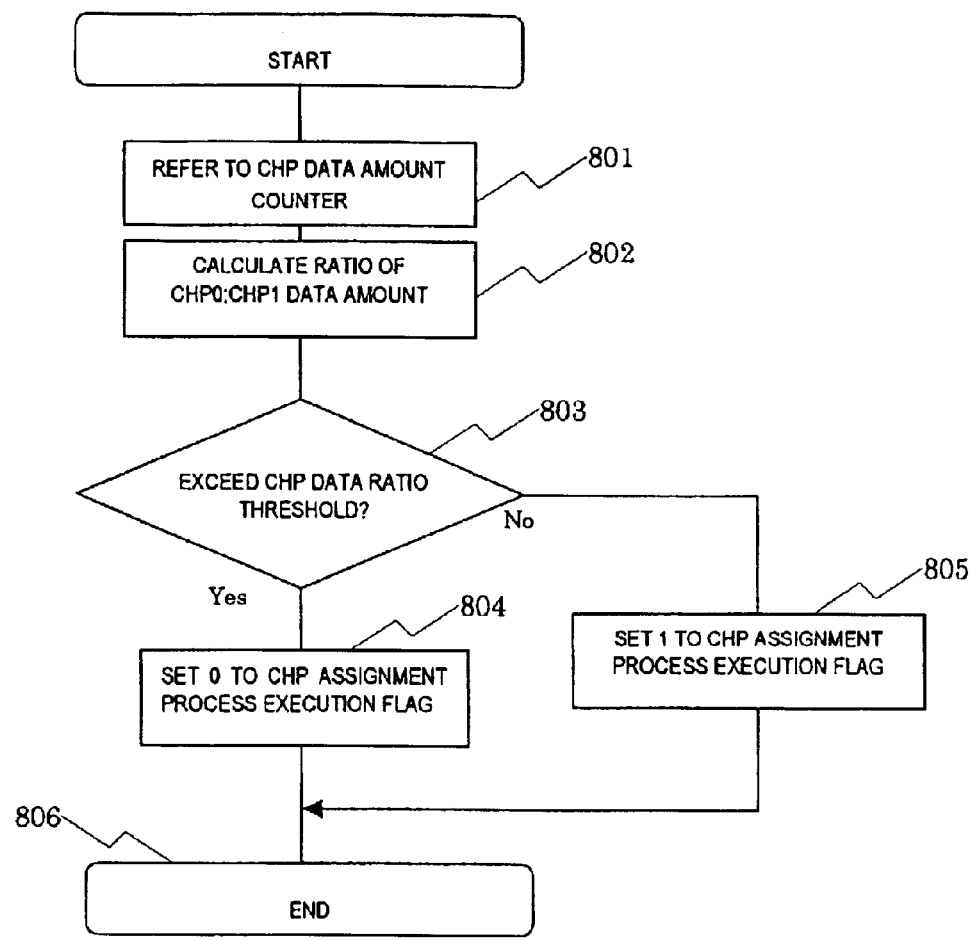
FIG. 8 is a flowchart explaining a process for controlling whether a CHP-assignment process is to be conducted, according to a ratio of CHP-0, 1-data-amount counters according to one embodiment of the present invention.

The third function of the storage control device 10 is to control the CHP-assignment-process execution flag 301 according to the ratio between the CHP-0-data-amount counter 305 and the CHP-1-data-amount counter 306 in the CHP-assignment-process management table 300. Specifically, the storage control device 10 compares, per a certain period of time, the ratio between the CHP-0, 1-data-amount counters 305, 306 with the CHP-data ratio threshold 307 in the CHP-assignment-process management table 300, and controls the CHP-assignment-process execution flag 301 according to whether the threshold is exceeded. FIG. 8 shows an example of the process in this case.

Figure 9:
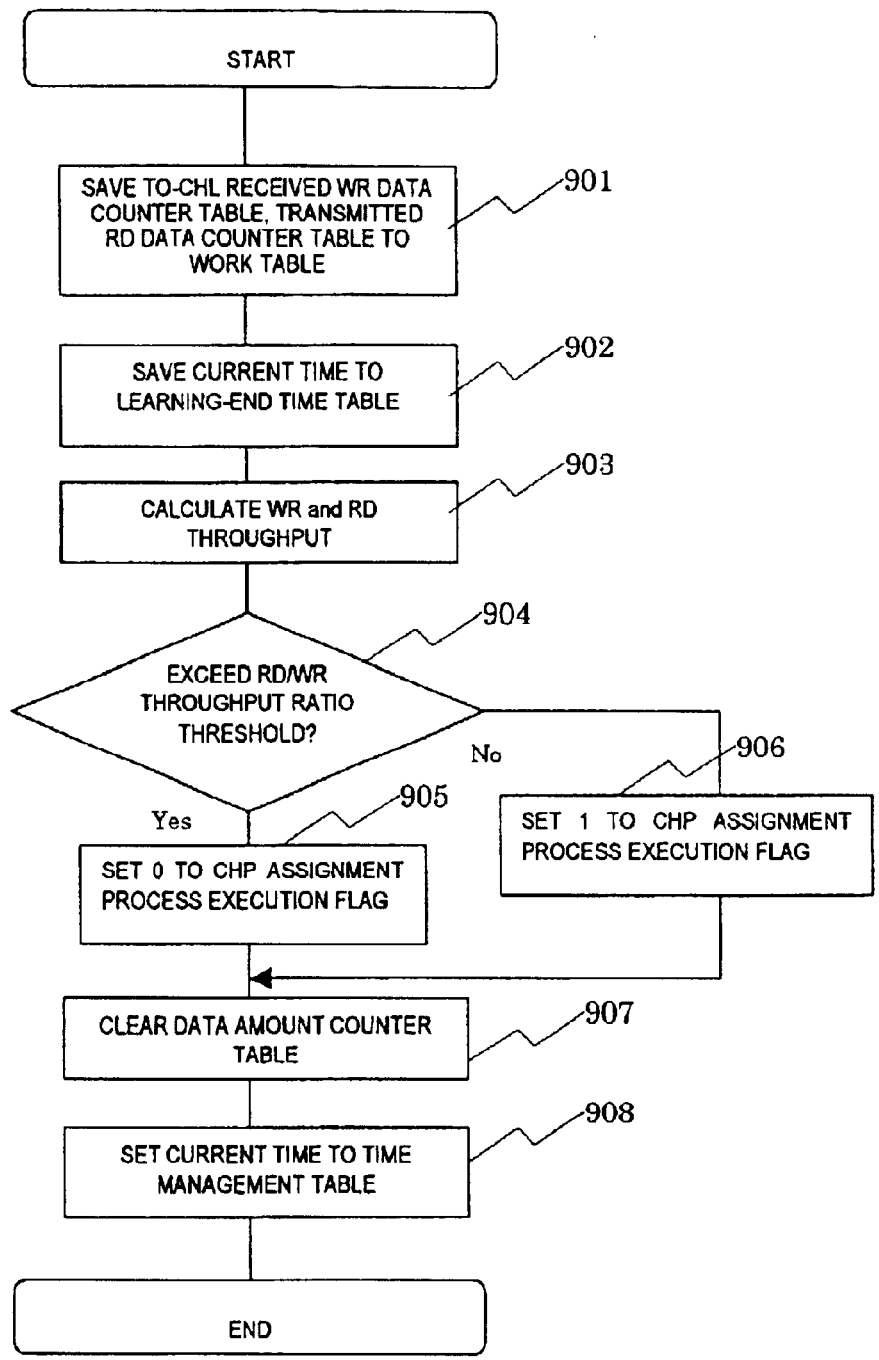
FIG. 9 is a flowchart explaining a process for controlling whether a CHP-assignment process is to be conducted, according to a rate of data amount processed by the storage control device per unit time (i.e., throughput) for a WR command and a RD command, respectively, according to one embodiment of the present invention.

The fourth function of the storage control device 10 is to control the CHP-assignment-process execution flag 301 according to the rate of data amount processed by the storage control device 10 per unit time (i.e., the throughput) Here, the throughput of the WR command and the RD command, respectively, is calculated from the rate of change of the received WR-command data-amount counter 302 and the transmitted RD-command data-amount counter 304 in the CHP-assignment-process management table 300 (step 901). That is, as shown in FIG. 9, the storage control device 10 calculates the throughput, which is the processed-data amount per unit time, from the difference between a counter value at a certain time and a counter value after a lapse of a unit time (steps 901–903, 907, 908), and the CHP-assignment-process execution flag 301 is controlled according to whether the such-obtained throughput rate exceeds the RD/WR-throughput rate threshold 311 in the CHP-assignment-process management table 300 (step 904).

According to the first to fourth functions explained above, it is possible to prevent biasing of load to one of the channels in cases where the host processing device 20 continuously sends frames containing either the WR command or the RD command only, or where the data amount of the data, to be the object of process with one command, is large.

Furthermore, by assigning a CHP for processing a frame according to the type of command (RD command or WR command) contained in the frame, it is possible to make the above-mentioned mechanism for providing load distribution between the receiving channel and the transmitting channel of the full-duplex channel to function more efficiently.

Note that the above-explained first to fourth functions do not have to be applied all at once; but only one of the functions may be applied, or, selected several functions may be applied.

Furthermore, the value for designating the interval for a polling process, for example, the value such as time and/or process-data number, may be designated by an external device such as the host processing device 20 or an operation-management terminal connected to the storage control device 10.

By the way, in the above embodiments, explanation was made in which the communication protocol is Fibre Channel Protocol. However, the present invention can be applied regardless of the type of communication protocol, if a data-processing system has a structure in which a host processing device 20 and a storage control device 10, comprising two or more channel processors, are connected in a full-duplex method.

The above embodiments explain a case where the storage control device 10 comprises two CHPs 13 in relation to one channel controlling section 14. However, it is needless to say that the present invention may be applied to cases in which three or more CHPs 13 are provided for one channel controlling section 14.

As explained above, according to the storage control device of the present invention, it becomes possible to efficiently use full-duplex channels.

Although the preferred embodiment of the present invention has been described in detail, it should be understood that various changes, substitutions and alternations can be made therein without departing from spirit and scope of the inventions as defined by the appended claims.

What is claimed is:

1. A storage control device adapted to be coupled to a host processing device through a full-duplex channel, the storage control device comprising:
a channel controller adapted to be coupled to the host processing device via the channel;
a cache memory for temporarily storing data received from the host processing device; and
a storage medium for storing data from the cache memory,
wherein the channel controller includes at least two processors for processing write-in and read-out commands issued by the host processing device, and when a ratio between a first amount of data to be read from the host processing device through a receiving channel of the full-duplex channel and a second amount of data to be written to the host processing device through a transmitting channel of the full-duplex channel becomes greater than a predetermined threshold, the channel controller controls processing to assign the lesser of the first amount and the second amount to the at least two processors.

2. A storage control device according to claim 1 wherein the channel controller assigns a processor according to whether the command is a write-in command to the storage medium or a read-out command to the storage medium.

3. A storage control device according to claim 1 wherein the channel controller assigns a processor according to an amount of data flowing through a transmitting channel and a receiving channel of the full-duplex channel.

4. A storage control device according to claim 1 wherein the channel controller assigns a processor according to one of an amount of data processed within a unit time with a write-in command to the storage medium and a read-out command to the storage medium.

5. A storage control device according to claim 1 wherein the channel controller assigns a processor according to a number of write-in commands and a number of read-out commands queued in a process-wait queue for each of the processors.

6. A storage control device according to claim 1 wherein the channel controller assigns a processor according to an amount of data processed by each of the processors within a unit time in processing the write-in and read-out commands.

7. A storage control device according to claim 1 wherein the channel controller assigns a processor according to a throughput for a process of a write-in command to the storage medium and a throughput for a process of a read-out command to the storage medium in the storage control device.

8. A storage control device according to claim 4 wherein the storage control device comprises a section coupled to an external device connected to the storage control device to cause the external device to designate the unit time.

9. A storage control device according to claim 6 wherein the storage control device comprises a section coupled to an external device connected to the storage control device to cause the external device to designate the unit time.

10. A storage control device adapted to be coupled to a host processing device through a full-duplex channel, the storage control device comprising:
a channel controller adapted to be coupled to the host processing device via the channel;
a cache memory for temporarily storing data received from the host processing device; and
a storage medium for storing data from the cache memory,
wherein the channel controller includes at least two processors that process write-in and read-out commands issued by the host processing device, and when a ratio between a first amount of data to be transferred over a receiving channel of the full-duplex channel and a second amount of data to be transferred over a transmitting channel of the full-duplex channel becomes greater than a predetermined threshold, the channel controller controls processing to assign the lesser of the first amount and the second amount to the at least two processors.

11. A storage control device according to claim 10 wherein the channel controller assigns a processor according to whether the command is a write-in command to the storage medium or a read-out command to the storage medium.

12. A storage control device according to claim 10 wherein the channel controller assigns a processor according to an amount of data flowing through a transmitting channel and a receiving channel of the full-duplex channel.

13. A storage control device according to claim 10 wherein the channel controller assigns a processor according to one of an amount of data processed within a unit time with a write-in command to the storage medium and a read-out command to the storage medium.

14. A storage control device according to claim 10 wherein the channel controller assigns a processor according to a number of write-in commands and a number of read-out commands queued in a process-wait queue for each of the processors.

15. A storage control device according to claim 10 wherein the channel controller assigns a processor according to an amount of data processed by each of the processors within a unit time in processing the write-in and read-out commands.

16. A storage control device according to claim 10 wherein the channel controller assigns a processor according to a throughput for a process of a write-in command to the storage medium and a throughput for a process of a read-out command to the storage medium in the storage control device.

17. A storage control device according to claim 13 wherein the storage control device comprises a section coupled to an external device connected to the storage control device to cause the external device to designate the unit time.

18. A storage control device according to claim 15 wherein the storage control device comprises a section coupled to an external device connected to the storage control device to cause the external device to designate the unit time.

* * * * *